United States Patent [19]
Lindblad

[11] 3,967,510
[45] July 6, 1976

[54] ACTUATION MEANS PREFERABLY INTENDED TO BE USED IN CONNECTION WITH SAFETY BELTS OF VEHICLES

[76] Inventor: Oskar Lennart Lindblad, Hedasgatan 16, 44020 Vargarda, Sweden

[22] Filed: Nov. 21, 1974

[21] Appl. No.: 525,985

[30] Foreign Application Priority Data
Nov. 21, 1973 Sweden.............................. 7315729

[52] U.S. Cl............................. 74/575; 74/577 S; 188/135; 200/61.48; 242/107.4 A
[51] Int. Cl.².................... G05G 5/00; B60T 7/12
[58] Field of Search..................... 74/577 S, 577 R; 242/107.4; 200/52 A, 64.45 R, 64.48, 64.52, 64.58 B; 188/135, 136

[56] References Cited
UNITED STATES PATENTS
3,758,044  9/1973  Nilsson ........................ 242/107.4
3,770,224  11/1973  Hayashi et al. .................. 242/107.4
3,868,068  2/1975  Heath ............................. 242/107.4

Primary Examiner—Samuel Scott
Assistant Examiner—F. D. Shoemaker
Attorney, Agent, or Firm—Wenderoth, Lind & Ponack

[57] ABSTRACT

An actuation device for use in connection with safety belts for vehicles includes a body of inertia sensing acceleration and/or retardation and positioned between a frame and a transmission element, which is movable away from and in a direction towards the frame. The body forms part of a spacer element assembly extending between the frame and the transmission element. The ends of the spacer element assembly pivotably bear against the transmission element and the frame. The spacer element assembly comprises at least two parts which, actuated by the body of inertia, can perform toggle-joint-like pivoting movement relative to each other.

9 Claims, 5 Drawing Figures

ACTUATION MEANS PREFERABLY INTENDED TO BE USED IN CONNECTION WITH SAFETY BELTS OF VEHICLES

BACKGROUND OF THE INVENTION

The present invention relates to an actuation means preferably intended for use in connection with safety belts for vehicles and comprising a body of inertia sensing acceleration and/or retardation and positioned between a frame and a transmission element, which latter is movable away from and in a direction towards the frame.

SUMMARY OF THE INVENTION

It is a principal object of the invention to provide an organ of actuation of the kind mentioned, which is of simple design, and which can be given a very good precision and reliability due to the fact that in connection with its movement it does not have to overcome any friction forces.

This object is achieved by using an actuation means made in accordance with the invention, which substantially is characterized by the body of inertia forming part of a spacer element assembly extending between the frame and the transmission element, the ends of the spacer element assembly pivotably bearing against the transmission element and the frame respectively, the spacer element comprising at least two parts, which actuated by the body of inertia can perform a toggle-joint-like pivoting movement relative to each other.

BRIEF DESCRIPTION OF THE DRAWINGS

A few examples of embodiments of the invention will be described in the following descriptions with reference to the accompanying drawings, in which FIG. 1 schematically illustrates a belt reel entering into a security belt assembly for vehicles, in which reel an actuation means made in accordance with the invention is incorporated, the actuation means being illustrated in form of a vertically extending cross section.

DETAILED DESCRIPTION OF THE INVENTION

Figure 1:
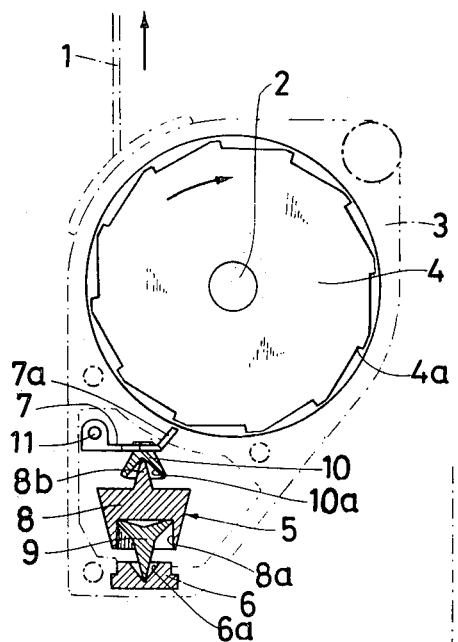
Figure 2:
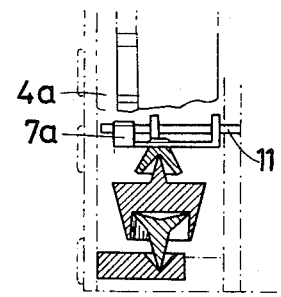
FIG. 2 is a schematical vertical cross section view as seen from the right in FIG. 1 showing the actuation means in rest position as is the case also in FIG. 1, i.e. in the non-functioning condition.
Figure 3:
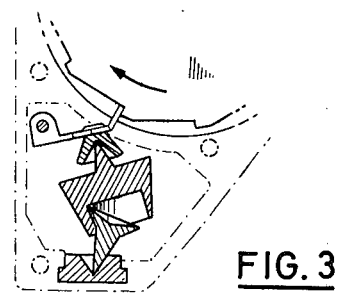
FIG. 3 is a cross section through the actuation means and corresponding to the view in FIG. 1, but with the actuation means in the functioning condition, i.e. a position in which it locks the belt reel.

In the accompanying drawings an actuation means made in accordance with the invention is arranged in connection with a belt reel belonging to a safety belt assembly mounted in a vehicle, which belt reel gets locked in case of abnormal changes of speed of the vehicle, but the invention can of course find application in other connections, where acceleration or retardation takes place, by way of example in connection with the actuation of switches and similar devices. The winding up means usually employed in connection with safety belts for vehicles generally exhibit a reel, on which the band 1 of the belt assembly can be wound up by the force of a helical spring. The reel usually is mounted on a central shaft 2, which is rotatably journalled in a stationary housing 3. At one end of the shaft the helical spring generally is arranged in such a manner that it tends to pivot the shaft 2 and consequently also the reel in the winding up direction of the band 1. At the other end of the shaft a notched wheel 4 is arranged, and when this wheel is subjected to a braking action, while the band 1 is being unwound, a brake not shown in the drawing is actuated impeding the band from being unwound further. The braking of the notched wheel 4 is brought about by an actuating means in its entirety indicated by 5 and which comprises a body of inertia 8 sensing acceleration and/or retardation and positioned between a frame 6 and a transmission element 7, which latter is movable away from or in direction towards frame 6, which body 8 forms part of a spacer element assembly extending between the frame 6 and the transmission element 7, its ends pivotably bearing against the transmission element and the frame respectively, the spacer element comprising two parts 8,9, which actuated by the body of inertia can perform a toggle joint like pivoting movement relative to each other. It is of course within the scope of the invention to employ more than two articulated parts. The body of inertia 8, which is made of comparatively heavy material, substantially exhibits the shape of the frustrum of a cone with its greater base facing in the upwards direction, a pointed conical projection 8b protruding from the surface of the upper base, which projection 8b rests in a recess 10a in a seat 10 provided on the transmission element 7, which is designed as a lever arm hinged on shaft 11, which seat suitably can be made of plastic or other light weight material. The seat 10 exhibits the shape of the frustrum of a cone with its greater base facing downwards, and with its smaller base by rivets or other suitable means being fastened to the lever arm 7, which is designed as a pawl, which by the influence of acceleration or retardation acting upon the body of inertia 8 can be pivoted from the position illustrated in FIG. 1, in which the lever arm 7 designed as a pawl is in the rest position, into the position illustrated in FIG. 3, in which the free end portion 7a of the lever arm engages in one of the notches 4a of the notched wheel 4. From the lower end surface of the body of inertia 8 a bore 8a is made, against the bottom of which the upwards facing base of part 9 rests. The base of the part is somewhat spot-faced, i.e. the surface thereof abutting against the bottom of the bore 8a is limited to beaklike peripherical edge. The conical part 9 rests with its point in a conical recess 6a in the frame 6. The angle between the opposite wall portions of the recess 6a is adjusted in such a manner that the wall of the recess constitutes a stop dog for the part 9, when the spacer element is swung out to the maximum of a desired swung out position (see FIG. 3). The part 9 like the part 8 can be made of comparatively heavy material, but a good function is also obtained, if it is made of light weight material by way of example plastics. The radial extension of the surfaces, with which the two parts 8 and 9 contact each other, is suitably adjusted to such effect that a pivoting out action is not obtained in case of a light deceleration of the vehicle, but a tilting takes place as soon as the retardation or acceleration exceed normal values. Due to the fact that the point of articulation, at which the two parts contact each other also during the pivoting out movement, is displaced sidewise, an upwards directed movement of the pawl 7 is obtained in connection with a pivoting out action. On account of the pointed parts, with which the spacer element is in contact with the transmission element 7 and the frame 6, and of the annular contact between the two parts 8 and 9, a uniform movement of the pawl 7 is obtained irrespective of the direction in which the force of inertia acts.

Figure 4:
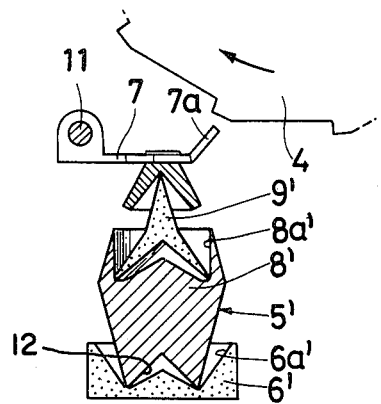
FIG. 4 shows a cross section, similar to the view of FIG. 1, but illustrating a somewhat different embodiment in the resting condition, i.e. the non-functioning condition.
Figure 5:
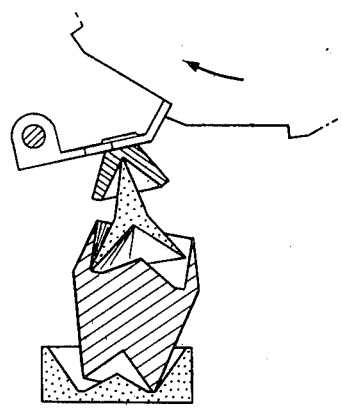
FIG. 5 is a cross sectional view of the actuation means of FIG. 4, but in the functioning condition, i.e. a position in which it locks the belt reel.

According to the embodiment illustrated in FIGS. 4 and 5 the heavier part 8' of the spacer element is located at the bottom, and the lighter portion 9' is located at the top. The part 8 substantially exhibits the shape of the frustrum of a cone with its smaller base facing downwards. A recess 12 is taken out in the downwards facing surface of the part 8', the side walls of which recess extend to the periphery of the part 8', by which arrangement a lower limiting edge exhibiting the shape of an annular beak is formed, which edge abuts against the bottom of a recess 6'a formed in the frame 6'. From the upper base surface of the part 8' a bore 8'a is formed, against the bottom of which the lower end of the conically shaped part 9' having its point pointing upwards rests, which conical part substantially exhibits the same shape as the part 9 of FIG. 1. By the shape of the part 8' widening in the upwards direction one obtains a comparatively high position of its center of gravity, which means that it will be comparatively sensitive to quick changes of speed caused by sidewise directed forces. In both embodiments the place of contract between the two parts 8,9 and 8', 9' respectively relative to the pivoting out direction is located on the opposite side of an imagined straight line between the points of contact of the spacer element with the frame and the transmission element also in the maximum of a swung out position, whereby an automatic return movement is obtained to the rest position, when the force of retardation or acceleration in question and the load on the notched wheel 4 has ceased.

The invention is not limited to the embodiments illustrated in the drawings and described above, but the arrangement can be varied as to its details within the frame of the subsequent claims without therefore departing from the fundamental idea of the invention. Likewise the actuation means is not limited to use in connection with safety belts only, but it can of course be used in other connections, where an acceleration or a retardation occurs, by way of example in order to actuate an electric switch.

What we claim is:

1. A locking actuation device of the type which is sensitive to acceleration and deceleration, particularly for use in connection with vehicle safety belts, said device comprising:

a fixed frame;
a transmission element which is movable from a first non-locking position to a second locking position, said second position being further spaced from said frame than said first position;
a spacer element assembly positioned between said frame and said transmission element and having first and second ends respectively pivotally bearing against said frame and said transmission element;
said spacer element assembly being formed by at least two separate parts which are pivotally articulated to form a toggle-like joint, said parts being laterally pivotable with respect to each other from a stable rest position with said transmission element in said first position to an unstable pivoted position with said transmission element in said second position; and
one of said parts comprising a body of inertia having an unstable center of gravity and forming means sensitive to acceleration and deceleration for laterally tilting with respect to the remainder of said at least two parts from said stable position to said unstable position and for causing said transmission element to move from said first position to said second position.

2. A device as claimed in claim 1, wherein when said parts are in said stable position mutual contact therebetween is annular in form.

3. A device as claimed in claim 1, wherein a first of said parts has a recess therein, a second of said parts extending into said recess.

4. A device as claimed in claim 3, wherein said first part comprises said body of inertia.

5. A device as claimed in claim 4, wherein said second part has an annular edge extending into said recess and in contact with the bottom thereof.

6. A device as claimed in claim 1, wherein said first end of said spacer element assembly comprises a pointed end portion resting in a corresponding recess in said frame.

7. A device as claimed in claim 1, wherein said first end of said spacer element assembly comprises an annular edge resting in a corresponding annular recess in said frame.

8. A device as claimed in claim 7, wherein said annular edge is in said body of inertia, and said annular recess comprises means to limit the extent of relative lateral pivoting movement of said parts when moving to said unstable position.

9. A device as claimed in claim 1, wherein said second end of said spacer element comprises a pointed end portion resting in a corresponding recess in said transmission element.

* * * * *